United States Patent Office 3,706,706
Patented Dec. 19, 1972

3,706,706
POLYETHERS CONTAINING PENDANT METAL
THIOSULFATE GROUPS
Edwin J. Vandenberg, Wilmington, Del., assignor to
Hercules Incorporated, Wilmington, Del.
No Drawing. Continuation-in-part of application Ser. No.
843,799, July 22, 1969. This application May 6, 1971,
Ser. No. 140,948
Int. Cl. C08g 23/06, 23/20, 23/04
U.S. Cl. 260—79.3 R                10 Claims

ABSTRACT OF THE DISCLOSURE

Modified polyethers containing pendant metal thiosulfate groups are described. The modified polyethers are prepared by reacting a polymer of an epihalohydrin or 1,4-dihalo-2,3-epoxybutane with a metal thiosulfate.

---

This application is a continuation-in-part of my application Ser. No. 843,799 filed July 22, 1969, and now abandoned.

This invention relates to polyethers containing ionic groups and more particularly to polyethers containing pendant metal thiosulfate groups.

Polyethers having pendant side chains from the main polymer backbone, which side chains contain halogen, as, for example, halomethyl groups, ether groups, as, for example, alkoxyalkyl groups or thiol groups are known. However, polyethers with pendant metal thiosulfate groups have not previously been prepared.

Now, in accordance with this invention, it has been found that polyethers containing pendant metal thiosulfate groups can be prepared by reacting polymers of epihalohydrins or 1,4-dihalo-2,3-epoxybutanes with a salt which is a metal thiosulfate and that form a very small replacement of the halogen in the starting polymer up to complete replacement by the salt can be effected in this manner.

By the term "polymer of epihalohydrin" or "polymer of 1,4-dihalo-2,3-epoxybutane" as used throughout this application is meant the homopolymers of the epihalohydrins or the 1,4-dihalo-2,3-epoxybutanes as well as the copolymers with one another and copolymers with up to 99.5% by weight of total monomer of at least one other cyclic oxide.

Thus, the present invention provides polyethers wherein from 0 to 99.8% of the repeating units are halogen-containing monomer units selected from the group consisting of epihalohydrin monomer units and 1,4-dihalo-2,3-epoxybutane monomer units, from 0 to 99.5% of the repeating units are monomer units of at least one other cyclic oxide, and from 0.2 to 100% of the repeating units having the formula

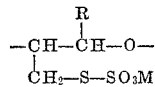

where R is hydrogen, —CH$_2$X or —CH$_2$—S—SO$_3$M, M is a salt forming metal and X is halogen, i.e. chlorine, bromine, iodine or fluorine.

The salt forming metal is preferably a Group I-A, I-B, II-A or II-B metal such as sodium, potassium, lithium, rubidium, cesium, copper, silver, magnesium, calcium, strontium, barium, zinc or cadmium, and most preferably sodium, potassium or lithium. Other suitable metals include those of Group IV-A, IV-B, V-A, V-B, and VI-B, as for example tin, lead, titanium, arsenic, antimony, vanadium, chromium and the like.

The polymers of epihalohydrins or 1,4 - dihalo - 2,3-epoxybutanes which are reacted with the salts in accordance with this invention preferably have weight average molecular weights of at least 25,000 and more preferably of at least 50,000 (RSV of at least 0.1 and preferably at least 0.2, as determined on a 0.1% solution in α-chloronaphthalene at 100° C.). The polymers are the known crystalline and amorphous homopolymers produced from any epihalohydrin, e.g. epichlorohydrin, epibromohydrin, epiiodohydrin or epifluorohydrin or any mixture of these epihalohydrins, the known crystalline and amorphous homopolymers produced from any 1,4-dihalo-2,3-epoxybutane, e.g. the cis or trans-1,4-dichloro-2,3-epoxybutane, the cis or trans-1,4-dibromo-2,3-epoxybutane, the cis or trans-1,4-diiodo-2,3-epoxybutane, the cis or trans-1,4-difluoro-2,3-epoxybutane, the cis or trans-1-chloro-4-bromo-2,3-epoxybutane, etc. or any mixtures of these 1,4-dihalo-2,3-epoxybutanes, and the known crystalline and amorphous copolymers or epihalohydrins such as epifluorohydrin, epibromohydrin, epiiodohydrin, and preferably epichlorohydrin, or the 1,4-dihalo-2,3-epoxybutanes and preferably cis or trans-1,4-dichloro-2,3-epoxybutane with up to 99.5%, preferably with up to 98% and most preferably with up to 95% by weight of the total monomers of at least one other cyclic oxide which is preferably an oxirane or oxetane. Specific oxiranes and oxetanes which can be copolymerized with the epihalohydrins or the 1,4-dihalo-2,3-epoxybutanes include the alkylene oxides having 2 to 20 carbon atoms, such as, for example, ethylene oxide, propylene oxide, butene-1 oxide, cis- and trans-butene-2 oxide; the cycloaliphatic epoxides containing 6 to 12 carbons such as cyclohexene oxide and the like; the aryl alkylene oxides such as styrene oxide, etc.; the saturated glycidyl ethers such as methyl glycidyl ether, ethyl glycidyl ether, phenyl glycidyl ether, etc.; the ethylenically unsaturated epoxides such as allyl glycidyl ether, the monoepoxides of dienes or polyenes or the glycidyl esters of ethylenically unsaturated acids, etc.; and the oxetanes such as oxetane, also designated as trimethylene oxide, the 2- or 3-mono-substituted oxetanes such as 2-chlorooxetane, 3-bromooxetane or the 2,2- or 3,3-di-substituted oxetanes. Other cyclic oxides suitable for copolymerization with the epihalohydrins or 1,4-dihalo-2,3-epoxybutanes include the tetrahydrofurans such as tetrahydrofuran, 2-, and 3-methyltetrahydrofuran, 2,3-dimethyltetrahydrofuran, 2,3,4-trimethyltetrahydrofuran, 2,3-diethyltetrahydrofuran, 2,3-diphenyltetrahydrofuran, and the like. Similarly, copolymers derived from epihalohydrin or 1,4-dihalo-2,3-epoxybutane and the haloalkyl glycidyl ethers such as β-chloroethyl glycidyl ether, the cis- and trans-halosubstituted alkylene oxides such as the 2-chloro-3,4-epoxybutane, 2-bromo-3,4-epoxybutane, 4-chloro-butene-1-oxide, 3,4-dichlorobutene-1-oxide, 2-chloro-4,5-epoxypentane, 5-chloropentene-1-oxide, 6-bromo-pentene-1-oxide, 6-bromo-pentene-2-oxide and 1,6-dichlorohexene-3-oxide, the halosubstituted cycloalkylene oxides such as 1-chloromethyl-2,3-epoxycyclohexane, 1,2 - bis-chloromethyl-3,4-epoxycyclohexane, 1-chloro - 4 - phenoxy-cis-2,3-epoxycyclobutane, amino epoxide monomers (or the quaternized form) such as 1-dialkyl amino-2,3-epoxypropane, o-, m- or p- dialkyl aminophenyl glycidyl ether, cis- or trans-1,4-bis(dialkylamino)-2,3-epoxybutane, 3- or 4-dialkylamino-1,2-epoxycyclohexane and the like can be modified in accordance with this invention. Exemplary polymers are also described in U.S. Patents 3,158,581; 3,158,591; 3,205,183; and 3,341,475.

The particular conditions for preparing the polyethers of the invention will vary depending on the starting polyether, the reactants, diluent (if used), the amount of modification desired, the ultimate end use, etc. In general, the reaction can be carried out in bulk, in a diluent in which the polyether is dispersed, or in a solvent for the polyether. The reaction is usually carried out at temperatures varying from about 30° C. to about 200°

C., and preferably at 50° C. to 150° C., for times varying from minutes to many hours (depending upon the temperature, degree of substitution desired, etc.) using from a stoichiometric amount up to a large excess of the amount of the salt necessary for the desired degree of substitution, as for example, using an amount equal to 1 to 500% of the reactive halogens present in the polymer. Preferably the substitution reaction is carried out in a solvent for the polyether and/or thiosulfate. Preferred solvents include dimethylsulfoxide, dimethylformamide, dimethylacetamide, hexamethylphosphoroamide, N-methylpyrrolidone, dioxane, tetrahydrofuran, dimethylether or diethylene glycol, acetone, water, etc. Liquids which are not solvents for the polyether, such as the aliphatic or aromatic hydrocarbons, the halogenated aromatic hydrocarbons and the like, can also be used if it is desired to carry out the reaction in liquid dispersion. Most preferably, the reaction is carried out in dimethyl sulfoxide as solvent or in bulk or in dispersion using a small amount of dimethyl sulfoxide.

The product can be recovered in conventional manner. When the reaction is carried out in a solvent, the product is usually isolated by evaporation of the solvent or by precipitation under mild conditions (at temperatures below 50° C.) to avoid cross-linking although more drastic conditions can be used if a partially or highly cross-linked product is desired. Generally, it is preferred to maintain the product in solution in a solvent such as water during purification or storage to avoid premature crosslinking.

The reaction products of this invention, contain at least 0.2 and preferably at least 0.5% of anionic groups which are metal thiosulfate groups. The polymeric products of this invention will vary widely depending upon the composition and nature of the starting polymer, that is, whether crystalline, amorphous, rubbery, water-soluble or insoluble, etc., and upon the amount of thiosulfate groups present in the product. In general, products of low substitution (containing less than 10% substitution) will vary from water-insoluble crystalline solids to water-insoluble elastomers and water-soluble crystalline or amorphous polymers, whereas products of higher substitution (containing greater than 10% substitution) will in general be more water-sensitive and usually will be water-soluble. Thus water-solubility of the products is dependent on substitution as well as the composition of the starting polymer. In general, starting polymers which are copolymers of epihalohydrin and a comonomer which contributes water solubility such as ethylene oxide, methyl glycidyl ether or the like require from 1 to about 10% substitution (depending upon the amount and particular comonomer, of course) for water solubility whereas other polymers require greater than 10 to about 20% substitution for solubility. Additionally, the products of this invention which are epihalohydrin copolymers having a high ethylene oxide content are more stable to heat, light, air oxidation and shear than similar copolymers, or even ethylene oxide homopolymers which do not contain metal thiosulfate groups. The presence of a small amount, i.e., from 0.2 up to 10% or higher of metal thiosulfate groups makes the polymers more stable and gives such polymers a greater field of utility, particularly as water-soluble thickeners, sizes, friction reducing agents, etc.

The thiosulfate containing products can be cross-linked by heating, by reacting with a base, base plus heat and/or air or, in some cases, by removing the solvent from the solution at moderate temperatures to give water-insensitive products, or they can be reacted with sodium sulfide to convert the thiosulfate groups into nonionic, non-water sensitive disulfide cross-links.

The following examples illustrate the preparation of the modified polyethers of this invention. All parts and percentages are by weight unless otherwise indicated. The dimethylsulfoxide used as solvent was dried prior to use by passage through a molecular sieve column. Unless otherwise indicated, the stabilizer used in the examples was the reaction product of 1 mole of crotonaldehyde and 3 moles of 3-methyl-6-tert-butyl-phenol, the product being essentially 1,1,3 - tris(2 - methyl - 4 - hydroxy-5-tert-butylphenyl) butane. The molecular weights given in the examples are weight average molecular weights of the polymer. When molecular weight is indicated by reduced specific viscosity (RSV), the term denotes the specific viscosity divided by concentration as determined on a solution of the polymer in a suitable solvent. The reduced specific viscosities of the modified polyethers were run on the dialyzed aqueous solution at 25° C. by taking a portion of the dialyzed solution and diluting to 0.1% polymer concentration using sufficient added potassium chloride to give 0.1 molar potassium chloride, unless otherwise indicated.

EXAMPLE 1

Five (5) parts of an epichlorohydrin-ethylene oxide copolymer (70% by weight epichlorohydrin; molecular weight of $2.7 \times 10^6$; RSV of 3.8 as determined on a 0.1% solution in 97% α-chloronaphthalene-3% acetylacetone at 100° C.; and containing 26.3% chlorine) containing 0.3% of stabilizer was dissolved in 138 parts of dry dimethyl sulfoxide at 65° C. under a nitrogen atmosphere, and 9.3 parts of sodium thiosulfate $$(Na_2S_2O_3 \cdot 5H_2O)$$

was added to the solution. The reaction mixture was then tumbled at 65° C. for 2 hours under a nitrogen atmosphere, after which time the insoluble material (unreacted sodium thiosulfate and sodium chloride by-product) was separated from the solution and from 3 to 4 volumes of water was added to the solution. A dimethyl sulfoxide-soluble, water-insoluble precipitate was formed (6.4% of total isolated product) and was separated from the solution, after which the remaining solution was dialyzed against distilled water to remove unreacted, dissolved sodium thiosulfate and dimethyl sulfoxide. The water-soluble polymer had an RSV of 0.10 and a molecular weight greater than $1 \times 10^6$. A portion of the dialyzed solution was then stripped of solvent and dried for 16 hours at 80° C. in vacuo (0.4 mm.), giving a rubbery film (4.36 parts solids based on the total solution) which was insoluble in and unswollen by water and thus was highly cross-linked. Analysis for sulfur and chlorine showed that the water-soluble polymer contained 13% of

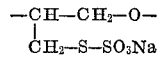

units.

EXAMPLE 2

The procedure of Example 1 was repeated except that the reaction mixture was tumbled for 9 hours. No water-insoluble, dimethyl sulfoxide-soluble precipitate formed on addition of water. The water-soluble polymer had an RSV of 0.07 and a molecular weight greater than $1 \times 10^6$. A portion of the dialyzed solution was stripped of solvent, freeze dried under vacuum and then dried for 3 hours at 50° C. under vacuum (0.4 mm.). This product (4.52 parts based on total solution) was a soft, white rubber which was insoluble in and very slightly swollen in water. Analysis for sulfur and chlorine howed that the water-soluble polymer contained 21% of

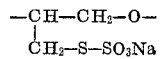

units.

EXAMPLE 3

Example 1 was repeated except that the reaction mixture was tumbled for 24 hours. No water-insoluble, dimethyl sulfoxide-soluble precipitate was formed. The water-soluble polymer had an RSV of 0.14 and a molecular weight greater than $1 \times 10^6$. The product recovered from a portion of the dialyzed solution (5.0 parts based on the total solution) gave a tough film of low extensibility which was insoluble in and unswollen by water. Analysis for sulfur and chlorine showed that the water-soluble polymer contained 28% of $$-\underset{\underset{CH_2-S-SO_3Na}{|}}{CH}-CH_2-O-$$

units.

EXAMPLE 4

Example 1 was repeated except that the reaction mixture was tumbled for 72 hours. No water-insoluble, dimethyl sulfoxide-soluble precipitate was formed. The water-soluble polymer had an RSV of 1.2 and a molecular weight greater than $0.5 \times 10^6$. The product which was recovered from a portion of the dialyzed solution (5.5 parts based on total solution) gave a hard, brittle film and was insoluble in water, and unswollen by water and slightly swollen by dimethyl sulfoxide. Sulfur and chlorine analyses (13.5% sulfur and 13.2% chlorine) showed that the water-soluble polymer contained 41% of $$-\underset{\underset{CH_2-S-SO_3Na}{|}}{CH}-CH_2-O-$$

units.

To a portion of the dimethylsulfoxide solution (prior to dialysis) equivalent to 1 part of polymer was added 2 parts of water and then 1 part of a 3% aqueous solution of hydrochloric acid. The resulting solution was stable at room temperature, but after heating on a steam bath for about 6 hours, gave a polymeric precipitate, indicating that hydrolysis of the sodium thiosulfate groups to the nonionic polymercaptan groups had taken place. The precipitate was insoluble in dimethylsulfoxide, indicating that cross-linking had occurred.

EXAMPLE 5

Example 1 was repeated except that the reaction mixture was tumbled for 72 hours at 95° C. No water-insoluble, dimethyl sulfoxide-soluble precipitate was formed on addition of water, and the solution was stable on heating on a steam bath for 20 hours. The water-soluble polymer had an RSV of 3.1 and a molecular weight greater than $0.5 \times 10^6$. The product which was recovered from a portion of the dialyzed solution (7.6 parts based on the total solution) gave a hard, brittle film which was insoluble in and unswollen by water. Analysis for sulfur and chlorine showed that the water-soluble polymer contained 70% of $$-\underset{\underset{CH_2-S-SO_3Na}{|}}{CH}-CH_2-O-$$

units. To each of two separate portions of the dialyzed solution was added an aqueous solution of either zinc chloride or calcium chloride in an amount sufficient to provide 10 moles of zinc or calcium chloride per sodium ion. Each portion was permitted to stand at room temperature for 72 hours, after which time the portion to which the calcium chloride was added was a solution containing a trace of insoluble matter and the portion to which the zinc chloride was added was a solution containing a slight amount of precipitate. Each portion was dialyzed 4 times against 1 molar zinc chloride or calcium chloride and then against distilled water until all of the soluble chloride ions were removed and precipitates formed. The precipitates were separated from the water-soluble fractions and then were washed and dried. The water-soluble fractions were recovered by stripping off the solvent, and the products dried under vacuum. The calcium-containing product was a colorless brittle solid and the zinc-containing product was a brittle brown solid. Sodium and zinc or calcium analyses on the water-soluble fractions indicated that 77.5% of the sodium was replaced by zinc and that 57.1% of the sodium was replaced by calcium, after allowance for the small amount of precipitate (1% of total product in the case of calcium and 5.5% of the total product in the case of zinc.)

Another portion of the dialyzed solution was treated at room temperature with 10% aqueous sodium sulfide in an amount sufficient to provide 1 mole of sodium sulfide for each thiosulfate group. At the end of 10 minutes the solution had turned to a solid yellow gel which gradually shrank after a total of 25 minutes to form a small solid phase (polymer) and a liquid phase. At the end of one hour the polymer was in the form of a small hard cylinder. The polymer, after air drying, was hard and tough.

Still another portion of the dialyzed solution was treated with sodium sulfide as above, except that a 10-fold molar excess of sodium sulfide was used. The gel-like precipitate was formed in 3 minutes and readily separated from the liquid phase as a compact discrete solid phase.

EXAMPLE 6

Example 1 was repeated except that 5.9 parts of anhydrous sodium thiosulfate was substituted for the 9.3 parts of the hydrated sodium thiosulfate and the reaction mixture was tumbled for 9 hours. The water-soluble polymer had an RSV of 0.076 and a molecular weight greater than $1.0 \times 10^6$. The polymer isolated from a portion of the dialyzed solution (4.48 parts solids based on the total solution) gave a rubbery film which was insoluble in and unswollen by water. Sulfur and chlorine analyses (3.9% sulfur and 22.5% chlorine) showed that the water-soluble polymer contained 11.7%

$$-\underset{\underset{CH_2-S-SO_3Na}{|}}{CH}-CH_2-O-$$

units.

EXAMPLE 7

One hundred (100) parts of an epichlorohydrin-ethylene oxide copolymer (64% by weight epichlorohydrin; RSV of 2.2 as determined on a 0.1% solution in 97% α-chloronaphthalene-3% acetyl acetone at 100° C.; and 24.1% chlorine) containing 0.6% stabilizer were intimately blended with 182 parts of sodium thiosulfate ($Na_2S_2O_3 \cdot 5H_2O$) on a two roll mill until uniform (approximately 35 minutes at 175° C.) after which time 25 parts of the blend were heated for 72 hours at 95° C. in a nitrogen atmosphere. The resulting product was washed several times with water, swollen with acetone, again washed with water and then dried at 80° C. for 16 hours. The product was 10 parts of a white rubber having a molecular weight greater than $3 \times 10^6$ and contained on analysis 3.6% sulfur and 22.1% chlorine, indicating that the product contained 10.8% of $$-\underset{\underset{CH_2-S-SO_3Na}{|}}{CH}-CH_2-O-$$

units.

EXAMPLE 8

Example 7 was repeated except that the heating was carried out for 72 hours at 65° C. The product which was insoluble in and unswollen by water, was washed 3 times with water and then dissolved in acetone to give a 1% solution. 1.5 volumes of water was next added to the solution to give a dilute emulsion, and then the acetone and one-half of the water were removed, leaving an emulsion. The resulting emulsion indicated that modification of the epichlorohydrin copolymer had occurred since under similar conditions, unmodified copolymer will precipitate as large particles. Three volumes of methanol were next added to the emulsion to partially coagulate the dispersed phase and then the coagulate was recovered by centrifugation, washed once with water and dried at 80° C. under vacuum. The product was a clear rubber (5.9 parts) having an RSV of 2.0 in 97% α-chloronaphthalene-3% acetyl acetone at 100° C. and a molecular weight greater than 1.0×10⁶. Sulfur analysis (0.98% sulfur) showed that the product contained 2% of

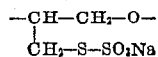

units. The supernatant liquid from the centrifugation step was a very finely divided dispersion. Based on solids analysis, the dispersion contained 3.5 parts of polymer which gave a slightly tacky film.

EXAMPLE 9

Five parts of the copolymer of Example 1 dissolved in 93.6 parts of acetone and 6.2 parts of water was mixed with 9.3 parts of sodium thiosulfate ($Na_2S_2O_3 \cdot 5H_2O$) and the reaction mixture was tumbled for 24 hours at 95° C. The reaction product comprised two phases, an acetone upper phase and an aqueous lower phase. Polymer was precipitated from the acetone phase with 3–4 volumes of water and the precipitate was recovered by centrifugation, washed 10 times with water and then dried at 80° C. for 16 hours under vacuum. The polymeric precipitate was 3.8 parts of a clear yellow rubber which contained, based on the sulfur analysis (0.94% sulfur) 3% of

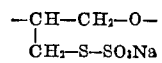

units. The acetone-water filtrate and water washings were combined, stripped and dried at 80° C. for 1 hour, giving 1.0 part of water-soluble product which gave a rubbery film.

EXAMPLES 10 TO 15

Various polymers of epichlorohydrin were tumbled at 95° C. with sodium thiosulfate ($Na_2S_2O_3 \cdot 5H_2O$), using dimethyl sulfoxide, N-methyl pyrrolidone or dimethyl formamide as solvent according to the general procedure of Example 1. After removal of any insoluble material, the resulting solutions were diluted with 2 volumes of water and then dialyzed against distilled water.

In these examples polymer was isolated by drying a portion of the dialyzed solution under vacuum in a desiccator at about 2° C. to constant weight (about 72 hours). In each case the product was a water-soluble film.

Details of reactants, conditions and products for these examples are contained in Table I, following.

mer had an RSV of 0.55 and contained, based on the sulfur analysis, 65% of

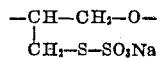

units.

EXAMPLE 17

Two parts of a 70:30 trans-cis copolymer of 1,4-dichloro-2,3-epoxybutane (prepared by polymerizing a mixture of trans and cis 1,4-dichloro-2,3-epoxybutane in methylene chloride at −60° C. using a triisobutylaluminum-0.7 water catalyst in n-heptane) having an RSV of 0.68 as determined on a 0.1% solution in dimethyl formamide at 50° C. was mixed with 55 parts of dry dimethylsulfoxide and 7.04 parts of sodium thiosulfate ($Na_2S_2O_3 \cdot 5H_2O$) under a nitrogen atmosphere and the mixture was tumbled for 70 hours at 95° C. The gel-like insoluble material which formed was separated from the solution, was washed once with dimethylsulfoxide and then 4 times with water and then was dried at room temperature under vacuum for 10 hours. The product was a slightly yellow, white powder (0.95 gram) which was highly swollen by dimethylsulfoxide and appeared to be lightly cross-linked. Analysis for sulfur and chlorine (19.8% sulfur and 17.2% chlorine) indicated that the polymer contained at least 74% of

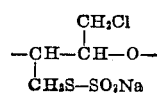

units.

Polymer was isolated from the dimethylsulfoxide filtrate and washings by adding 5–10 volumes of isopropanol to the combined solutions, separating the precipitate, washing the precipitate twice with isopropanol, three times with water and then once with methanol containing 0.05% of 4,4'-thiobis-(3-methyl-6-tertbutyl phenol) as stabilizer, and then drying for 16 hours under vacuum at room temperature. The dimethylsulfoxide soluble product was a white powder (0.60 gram) having an RSV of 0.18 (measured on a 0.1% solution in dimethylformamide at 50° C.). Analysis for sulfur and

TABLE I

| | Epichlorohydrin polymer | | | Sodium thiosulfate (parts) | Solvent | | Reaction conditions | | Product | | |
|---|---|---|---|---|---|---|---|---|---|---|---|
| Ex. No. | Ethylene oxide (wt. percent) | RSV a | Amount (parts) | | Name c | Parts | Temp. (°C.) | Time (hrs.) | Parts | RSV | —CH—CH₂—O— \| CH₂—S—SO₃Na units d (percent) |
| 10 | 79.8 | 4.3 | 5 | 2.69 | DMSO | 138 | 95 | 24 | 5.6 | 2.0 | 24 |
| 11 | 60.0 | 4.9 | 5 | 5.24 | DMSO | 138 | 95 | 24 | 6.3 | 1.2 | 36 |
| 12 | 0 | 1.9 | b | 13.3 | DMSO | 138 | 95 | 24 | 4.8 | 1.1 | 57 |
| 13 | 30 | 3.8 | 5 | 9.3 | NMP | 129 | 95 | 72 | 4.1 | 0.04 | 9 |
| 14 | 30 | 3.8 | 5 | 9.3 | DMF | 119 | 95 | 72 | 4.8 | 0.13 | 17 |
| 15 | 30 | 3.8 | 5 | 9.3 | DMSO | 138 | 95 | 24 | 6.4 | 3.5 | 57 | a Determined on 0.1% solution in 97% α-chloronaphthalene-3% acetylacetone at 100° C.
b Mixture of 55% crystalline (isotactic) and 45% amorphous polyepichlorohydrin.
c DMSO=dimethylsulfoxide; NMP=N-methyl pyrrolidone; DMF=dimethyl formamide.
d Based on sulfur analysis.

EXAMPLE 16

To a reaction vessel equipped with a stirrer and containing 5 parts of the epichlorohydrin-ethylene oxide copolymer used in Example 1 dissolved in 128 parts of N-methyl pyrrolidone was added 5 parts of sodium thiosulfate ($Na_2S_2O_3 \cdot 5H_2O$). The contents of the vessel were heated to 160° C. and stirred, under a nitrogen atmosphere for 8 hours at 160° C. after which time the product was a dark, viscous solution which was completely miscible with water. An equal volume of water was next added to the solution and the solution was dialyzed against distilled water. A portion of the dialyzed solution was then stripped and dried as in Example 1. Based on the total solution, 5.0 parts of a hard film were obtained. The poly-chlorine (20.02% sulfur and 17.35% chlorine) indicated that the polymer contained at least 75% of

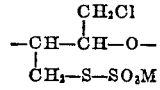

units.

The water soluble fraction was isolated by combining the isopropanol and water washes, dialyzing against water and drying at room temperature under vacuum for 16 hours. Based on solids analysis, the product contained 0.2 gram of polymer which gave an adhering film.

EXAMPLE 18

The procedure of Example 17 was repeated except that 2 parts of a crystalline poly(trans 1,4-dichloro-2,3-epoxybutane) was substituted for the 2 parts of trans-cis copolymer. The crystalline poly(trans 1,4-dichloro-2,3-epoxybutane) had an RSV of 0.74 determined on a 0.1% solution in tetrahydrofuran at 25° C. and was prepared by polymerizing trans-1,4-dichloro-2,3-epoxybutane in methylene chloride at −78° C. using a triisobutylaluminum-0.7 water catalyst in n-heptane. The dimethylsulfoxide insoluble polymer (1.07 grams) was a white powder. Sulfur and chlorine analyses (19.97% sulfur and 17.12% chlorine) indicated that the polymer contained at least 75%

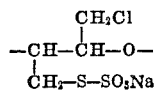

units.

The isolated dimethylsulfoxide soluble polymer was 0.71 gram of a white powder having an RSV of 0.17 determined on a 0.1% solution in tetrahydrofuran at 25° C. Sulfur and chlorine analyses (19.43% sulfur and 17.32% chlorine) indicated that the polymer contained at least 73% of

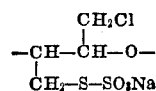

units. The water soluble fraction was 0.3 gram of polymer which gave an adhering film.

The foregoing examples demonstrate the production of polyethers containing —S—SO$_3$M groups. Thus, this invention provides a ready source of polymers containing an ionic group which is relatively insensitive to polyvalent ions. These polymers are useful as coatings for various substrates such as metal, glass, textiles, paper, wood and the like and can be applied as dispersions or solutions or by electrodeposition. The polymers are also useful as binders or adhesives for woven or nonwoven textiles, paper, plastics, film, etc., as textile sizing agents or as textile treating agents to provide static resistance and prevent soil redeposition, as shrinkproofing agents for wool, as emulsifiers, dispersants, flocculants, protective colloids, etc., as hair treating agents, as semi-permeable membranes for water desalination and other industrial applications employing the reverse osmosis principle, as ion exchange resins (preferably in cross-linked form), as drilling mud additives, etc. These polymers are also useful for molded articles, vulcanized rubbers, foams, fibers, films, etc. The utility of the polymers of this invention and particularly the polymers containing

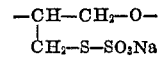

units as membranes for water desalination is demonstrated by the following examples.

EXAMPLES 19 TO 22

Films were prepared by casting a portion of the dialyzed solution prepared in Examples 2, 4 or 5 over a water-wet VF millipore support sheet (4 x 5″ sheet of filter paper composed of esters of cellulose of 0.01μ pore size) supported on a glass plate and drying first at room temperature for 16 hours and then 80° C. for 16 hours.

Discs (47 mm. diameter) were then cut from the film and sheet and evaluated as membranes by supporting the discs in tests cells assembled from high pressure filter holders and through which a brine solution was circulated at a rate of 200–400 ml./min. The membranes were tested at 1500 p.s.i. for extended lengths of time and permeate was collected from the bottom port of the cell and analyzed for Na$^+$, Cl$^-$ and SO$_4^{--}$ ions. The brine solution contained approximately 7000 p.p.m. NaCl (2730 p.p.m. Na$^+$, 4200 p.p.m. Cl$^-$) and 3000 p.p.m. Na$_2$SO$_4$ (930 p.p.m. Na$^+$, 2000 p.p.m. SO$_4^{--}$). Rejections at 1500 p.s.i. are given below.

TABLE II

| Example No. | Film Ex. No. | Thickness (mils) | Percent rejection Na$^+$ | Cl$^-$ | SO$_4^{--}$ | Flux rate (g.f.d.) [a] |
|---|---|---|---|---|---|---|
| 19 | 2 | 1.0 | 99.6 | 98.6 | 94.1 | 0.12 |
| 20 | 4 | 1.5 | 65 | 46 | 71 | 3.5 |
| 21 | 5 | 1.0 | 89 | 85 | 78 | 3.9 |
| 22 | 5 | 0.5 | 61 | 52 | 80 | 16.1 |

[a] Measure of the number of gallons per square foot per day (g.f.d.) which can be forced through the membrane.

The polymers of this invention can also be further modified by known chemical reactions. For example, the polymers can be modified by: treatment with dilute acids to give mercapto end groups which can then be cross-linked by oxidation with air, hydrogen peroxide, etc.; treatment with a base to yield pendant disulfide, sulfenic acid or sulfite groups; treatment with oxidizing agents such as iodine, chlorine, bromine, hydrogen peroxide, hydroperoxides, etc. to give disulfide groups which can be further oxidized to sulfonic acid groups, or, under certain conditions using chlorine in water or an organic solvent to give pendant sulfonyl chloride groups which can be further treated with a base such as sodium hydroxide to give sulfonate groups, with alcohols to give sulfonate ester groups or ammonia or amines to give sulfonamide products or mixed products containing sulfonate and/or sulfonamide and —S—SO$_3$M groups; treatment with reducing agents such as sodium amalgan or zinc under acid conditions to give pendant mercapto groups; electrolytic reduction to give disulfide groups; reaction with sodium sulfide or thiols to give disulfide groups; reaction with thiourea, iodides, or thiocyanates to give disulfide groups; reaction with mercuric salts as for example with mercuric chloride to give chloromercuric mercaptides or with mercuric cyanide to give dimercaptides, useful as bacteriocides or insecticides; reaction with cyanides in aqueous solution to give thiocyanates useful as insecticides; treatment with heat to give inter- or intra-molecular disulfides; reaction with formaldehyde in the presence of acid catalyst to give cross-linking; and the like.

The polyethers of this invention contain strong ionic groups which can readily be destroyed after they have served their function e.g. in coating systems where water solubility or dispersibility is desired prior to and during application and water-insolubility is desired after drying.

The products of ths invention can also contain stabilizers such as antioxidants, peroxides decomposers, acid acceptors, corrosion inhibitors and the like, cross-linking agents or promoters, plasticizers, reinforcing or non-reinforcing fillers, pigments, dyes, etc.

What I claim and desire to protect by Letters Patent is:

1. An essentially linear polyether wherein from 0 to 99.8% of the repeating units are halogen-containing monomer units selected from the group consisting of epihalohydrin monomer units and 1,4-dihalo-2,3-epoxybutane monomer units, from 0 to 99.5% of the repeating units are monomer units of at least one other cyclic oxide selected from the group consisting of oxiranes, oxetanes and tetrahydrofurans and from 0.2 to 100% of the repeating units have the formula

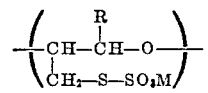

where R is hydrogen or —CH$_2$X, M is a salt forming metal and X is halogen, said polyether having a weight average molecular weight of at least 25,000.

2. The polyether of claim 1 wherein 0 to 99.8% of the repeating units are chlorine-containing monomer units selected from the group consisting of epichlorohydrin units and 1,4-dichloro-2,3-epoxybutane monomer units, and 0.2 to 100% of the repeating units have the formula

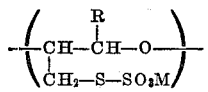

where R is hydrogen or —CH$_2$Cl and M is sodium.

3. The polyether of claim 2 wherein the chlorine-containing monomer is epichlorohydrin.

4. The polyether of claim 2 wherein the chlorine-containing monomer is trans-1,4-dichloro-2,3-epoxybutane.

5. The polyether of claim 2 wherein the chlorine-containing monomer is a mixture of cis- and trans-1,4-dichloro-2,3-epoxybutane.

6. The polyether of claim 1 wherein the halogen-containing monomer is epichlorohydrin.

7. The polyether of claim 6 wherein the oxirane is an alkylene oxide containing 2 to 20 carbon atoms.

8. The polyether of claim 7 wherein the alkylene oxide is ethylene oxide.

9. The polyether of claim 8 wherein M is calcium.

10. The polyether of claim 8 wherein M is zinc.

References Cited

UNITED STATES PATENTS 2,861,101   11/1958   Tousignat _____ 260—513
3,205,183   9/1965   Vandenberg _____ 260—2

HARRY WONG, JR., Primary Examiner

C. A. HENDERSON, JR., Assistant Examiner

U.S. Cl. X.R.

117—121 R, 139.5 A; 210—500 R; 252—8.5 R, 302; 260—2 EP, 2 X A, 2.2 R; 424—70